(12) United States Patent
Ben Nun et al.

(10) Patent No.: US 6,928,482 B1
(45) Date of Patent: Aug. 9, 2005

(54) METHOD AND APPARATUS FOR SCALABLE PROCESS FLOW LOAD BALANCING OF A MULTIPLICITY OF PARALLEL PACKET PROCESSORS IN A DIGITAL COMMUNICATION NETWORK

(75) Inventors: Michael Ben Nun, Ramat Hasharon (IL); Sagi Ravid, Zichron Yakov (IL); Itzhak Barak, Kadima (IL); Ofer Weill, Aderet (IL)

(73) Assignee: Cisco Technology, Inc., San Jose, CA (US)

( * ) Notice: Subject to any disclaimer, the term of this patent is extended or adjusted under 35 U.S.C. 154(b) by 881 days.

(21) Appl. No.: 09/606,214

(22) Filed: Jun. 29, 2000

(51) Int. Cl.[7] .............................................. G06F 15/16
(52) U.S. Cl. ..................................... 709/235; 370/235
(58) Field of Search ............................... 709/224, 225, 709/226, 223, 235–238; 370/229–235

(56) References Cited

U.S. PATENT DOCUMENTS

| | | | |
|---|---|---|---|
| 4,881,178 A * | 11/1989 | Holland et al. ................ 706/12 |
| 5,271,003 A | 12/1993 | Lee et al. ................... 370/58.2 |
| 5,539,883 A | 7/1996 | Allon et al. ........... 395/200.11 |
| 5,548,724 A | 8/1996 | Akizawa et al. ........ 395/200.03 |
| 5,668,993 A | 9/1997 | Peters et al. ................. 395/671 |
| 5,687,372 A | 11/1997 | Hotea et al. ................. 395/675 |
| 5,764,981 A | 6/1998 | Brice et al. .................. 395/671 |
| 5,774,668 A | 6/1998 | Choquier et al. ....... 395/200.53 |
| 5,778,224 A | 7/1998 | Tobe et al. ................... 395/670 |
| 5,784,697 A | 7/1998 | Funk et al. .................. 711/170 |
| 5,802,301 A | 9/1998 | Dan et al. .............. 395/200.53 |
| 5,806,059 A | 9/1998 | Tsuchida et al. ................ 707/2 |
| 5,819,045 A * | 10/1998 | Raman et al. ............... 709/226 |
| 5,825,860 A | 10/1998 | Mohorram ................... 379/133 |
| 5,841,775 A | 11/1998 | Huang .......................... 370/422 |
| 5,845,091 A * | 12/1998 | Dunne et al. ................ 709/240 |
| 5,848,411 A | 12/1998 | Yamagishi ...................... 707/8 |
| 5,870,604 A | 2/1999 | Yamagishi ................... 395/675 |
| 5,872,972 A | 2/1999 | Boland et al. ............... 395/672 |
| 5,898,870 A | 4/1999 | Okuda et al. ................ 395/674 |
| 5,951,634 A | 9/1999 | Sitbon et al. ................ 709/105 |
| 5,983,281 A | 11/1999 | Ogle et al. ................... 709/249 |

(Continued)

OTHER PUBLICATIONS

Rabin,"Efficient Dispersal of Information for Security, Load Balancing, and Fault Tolerant", Harvard University Journal of the Association for Computing Machinery, vol. 36, No. 2, Apr. 1989, pp. 335-348.*

Primary Examiner—Bunjob Jaroenchonwanit
(74) Attorney, Agent, or Firm—Abelman, Frayne & Schwab

(57) ABSTRACT

An apparatus for distributing processing loads in a service aware network is provided. The apparatus contains a controller and a plurality of packet processors coupled to the controller. The controller receives a first data packet and determines whether or not any of the packet processors have been previously selected to process the first data packet based on a classification of the first data packet. When none of the packet processors has been previously designated to process the first data packet, the controller selects a first selected processor of the packet processors to process the first data packet. The first selected processor is selected based on processing load values respectively corresponding to processing loads of the packet processors. In addition, a method performed by the apparatus and a software program for controlling the controller are also provided.

124 Claims, 9 Drawing Sheets

U.S. PATENT DOCUMENTS

| | | | |
|---|---|---|---|
| 5,991,808 A | 11/1999 | Broder et al. | 709/226 |
| 5,999,916 A | 12/1999 | Peters et al. | 705/34 |
| 6,006,259 A | 12/1999 | Adelman et al. | 709/223 |
| 6,026,425 A | 2/2000 | Suguri et al. | 709/105 |
| 6,088,511 A * | 7/2000 | Hardwick | 717/149 |
| 6,272,136 B1 * | 8/2001 | Lin et al. | 370/392 |
| 6,466,976 B1 * | 10/2002 | Alles et al. | 709/224 |
| 6,466,985 B1 * | 10/2002 | Goyal et al. | 709/238 |
| 6,483,804 B1 * | 11/2002 | Muller et al. | 370/230 |
| 6,510,135 B1 * | 1/2003 | Almulhem et al. | 370/229 |
| 6,549,516 B1 * | 4/2003 | Albert et al. | 370/236 |
| 6,604,147 B1 * | 8/2003 | Woo | 709/240 |
| 6,615,358 B1 * | 9/2003 | Dowd et al. | 713/201 |
| 6,658,565 B1 * | 12/2003 | Gupta et al. | 713/153 |
| 6,700,889 B1 | 3/2004 | Nun | |
| 2002/0009079 A1 * | 1/2002 | Jungck et al. | 370/389 |
| 2002/0097736 A1 * | 7/2002 | Cohen | 370/419 |
| 2003/0110284 A1 | 6/2003 | Nun | |
| 2004/0030745 A1 * | 2/2004 | Boucher et al. | 709/203 |

* cited by examiner

| Processing Load Information | Processing Load | Action |
|---|---|---|
| 00 | Unavailable | Assign no new process flows to processor. |
| 01 | Heavily Loaded | Assign only a few more new process flows to processor. |
| 10 | Moderately Loaded | Assign new process flows to processor occasionally. |
| 11 | Lightly Loaded | Assign new process flows to processor as necessary. |

Fig. 3

| Packet Processor | Processing Load Information | Round One | Round Two | Round Three | Round Four |
|---|---|---|---|---|---|
| Processor PP1 | 11 | Assign | Assign | Assign | Assign |
| Processor PP2 | 10 | X | Assign | X | Assign |
| Processor PP3 | 01 | X | X | Assign | X |
| Processor PP4 | 01 | X | X | Assign | X |
| Processor PP5 | 00 | X | Assign | Assign | X |
| Processor PP6 | 11 | Assign | Assign | X | Assign |
| Processor PP7 | 10 | X | Assign | X | Assign |
| Processor PP8 | 01 | X | X | Assign | X |

Fig. 4

| Processing Load Percentage | Processing Load | Action |
|---|---|---|
| 75% to 100% | Unavailable | Assign no new process flows to processor. |
| 50% to 74% | Heavily Loaded | Assign only a few more new process flows to processor. |
| 25% to 49% | Moderately Loaded | Assign new process flows to processor occasionally. |
| 0% to 24% | Lightly Loaded | Assign new process flows to processor as necessary. |

Fig. 5

| Idle Time | Processing Load | Action |
|---|---|---|
| Less Than Time Period A | Unavailable | Assign no new process flows to processor. |
| Greater Than Time Period A And Less Than Time Period B | Heavily Loaded | Assign only a few more new process flows to processor. |
| Greater Than Time Period B And Less Than Time Period C | Moderately Loaded | Assign new process flows to processor occasionally. |
| Greater Than Time Period C | Lightly Loaded | Assign new process flows to processor as necessary. |

Fig. 6

| Data Rate At Which Data Supplied To Processor | Processing Load | Action |
| --- | --- | --- |
| Greater Than Data Rate A | Unavailable | Assign no new process flows to processor. |
| Less Than Data Rate A And Greater Than Data Rate B | Heavily Loaded | Assign only a few more new process flows to processor. |
| Less Than Data Rate B And Greater Than Data Rate C | Moderately Loaded | Assign new process flows to processor occasionally. |
| Less Than Data Rate C | Lightly Loaded | Assign new process flows to processor as necessary. |

Fig. 7

METHOD AND APPARATUS FOR SCALABLE PROCESS FLOW LOAD BALANCING OF A MULTIPLICITY OF PARALLEL PACKET PROCESSORS IN A DIGITAL COMMUNICATION NETWORK

FIELD OF THE INVENTION

The present invention relates to an apparatus that monitors data packets transmitted on a data network and processes the data packets. More particularly, the present invention relates to an apparatus that classifies the data packets and associates the classified data packets with a particular data flow. Then, the apparatus selects a particular packet processor from a plurality of packet processors to process the classified data packets that correspond to the particular data flow. Also, the apparatus determines which one of the plurality of packet processors to select from as the particular packet processor to process a particular process flow, based on information relating to the processing loads of the processors. By designating certain packet processors to process data packets corresponding to data flows based on the load of the processors, the apparatus can ensure that the processing loads of the plurality of packet processors is balanced and allows for wire speed processing of the process flows. Furthermore, the present invention relates to a method and a software routine employed by the apparatus.

BACKGROUND OF THE INVENTION

In a digital communication network (e.g. the internet, wide area network ("WAN"), local area network ("LAN"), service aware network ("SAN"), etc.), data packets are transmitted over the network between a source computer (e.g. a personal computer, router, server, etc.) and a destination computer (e.g. a personal computer, router, server, etc.). Furthermore, in a network that is capable of full duplex communications, data packets can be simultaneously transmitted from the source computer to the destination computer and from the destination computer to the source computer over the same data path or channel. The transmission of data from the source computer to the destination computer is typically referred to as a "downstream" transmission of the data packets. Conversely, the transmission of data from the destination computer to the source computer is generally referred to as an "upstream" transmission.

Typically, data networks contain a relatively large number of computers, and each of the computers can operate as both a source computer and a destination computer. For example, in one instance, a particular computer in the network may perform an operation and output data to another computer in the network. In such a situation, the particular computer acts as a source computer. However, in another instance, the particular computer may receive data from another computer in the system, and in such a situation, the particular computer acts as a destination computer.

Often, each of the computers in the network forms at least part of a "node" of the network, and data is transferred among the various nodes by transmitting data packets among the computers. In an illustrative scenario, a first computer located at a first node may run a first application program that generates first data to be subsequently processed by a second computer at a second node. For example, the first data may relate to a specific application and may be application layer data. The evaluation of such application layer data is typically useful in managing the operation of various systems in the network.

In order to transfer the first data to the second computer so that it can be processed, the first computer divides the first data into a plurality of data segments and forms one or more data packets corresponding to each of the data segments. Then, the data packets are transmitted downstream from the first computer to the second computer. After the second computer receives the data packets, it may respond by sending a corresponding confirmation packet upstream to the first computer. Also, if the network is capable of full duplex communications, the second computer may simultaneously transmit data packets upstream to the first computer when the first computer is transmitting data packets downstream to the second computer.

Each of the data packets transmitted from the first computer to the second computer (and transmitted from the second computer to the first computer) typically contains a data packet header. The header often includes data that identifies the type of data contained in the data packet, the source computer from which the data packet was transmitted, the intended destination computer of the data packet, etc. An example of a data packet header is illustrated in FIG. 1.

As shown in the figure, the header HDR comprises a source internet protocol ("IP") address field 100, a destination IP address field 110, a protocol field 120, a source port field 130, and a destination port field 140. The source IP address field 100 contains a 32-bit source IP address that identifies the source computer transmitting the data packet. The destination IP address field 110 contains a 32-bit destination address that identifies the intended destination computer of the data packet. The protocol field 120 contains eight bits of protocol data that identify the data format and/or the transmission format of the data contained in the data packet. The source port field 130 includes sixteen bits of data that identify the computer port that physically outputs the data packet, and the destination port field 140 contains sixteen bits of data that represent the computer port that is supposed to input the data packet.

When data packets are transmitted over the network from the source computer to the destination computer, they are input by various network components that process the data packets and direct them to the appropriate destination computer. Such network components may be included in the destination computer and/or may be contained in an intermediate computer that processes the data as it is being transmitted from the source computer to the destination computer. If the data packets can be quickly and efficiently processed and routed between the various nodes of the network, the operation of the entire network is enhanced. For example, by quickly and efficiently transmitting data packets to the destination computer, the quality of real-time applications such as internet video conferencing and internet voice conferencing is improved. Also, the network components can quickly process the data packets to determine if they are authorized to be transmitted to the destination computer, and if they are not, the network components discard the data packets. As a result, the security of the network is greatly enhanced. The ability to handle the above mentioned situations on a higher level than the basic packet level alone, will further enhance the desired system level performance.

Before processing a data packet, a network component must "classify" the data packet according to various characteristics of the data packet and/or the data contained in the packet. Then, the network component processes the data packet based on its classification. Furthermore, the classification of the data packet enables the data packet to be associated with the other data packets belonging to a particular stream of packets. As a result, data packets belonging to a certain stream or "process flow" can all be processed by the same packet processing unit within the network component. By processing the data packets belonging to the same process flow, the packet processing unit can process the data packets in a more efficient manner.

A data packet is usually classified by evaluating the information contained in the data packet header. For example, if the data packet contains the header HDR shown in FIG. 1, a network component may classify the data packet as a first type of data packet if the source IP address falls within a first range of source IP addresses, the destination IP address falls within a first range of destination IP addresses, the protocol data falls within a first range of protocol data values, the source port data falls within a first range of source port data values, and the destination port data falls within a first range of destination port data values. On the other hand, the internet component may classify the data packet as a second type of data packet if the source IP address, destination IP address, protocol data, source port data, and destination port data respectively fall within a second range of source IP addresses, a second range of destination IP addresses, a second range of protocol data values, a second range of source port data values, and a second range of destination port data values.

Each group of data value ranges by which a data packet is classified may be considered to be a "rule". Thus, in the examples above, the data packet is classified as the first type of data packet if its header HDR satisfies a first rule defined by the first range of source IP addresses, destination IP addresses, protocol data values, source port data values, and destination port data values. On the other hand, the data packet is classified as the second type of data packet if its header HDR satisfies a second rule defined by the second range of source IP addresses, destination IP addresses, protocol data values, source port data values, and destination port data values. Furthermore, the data packets may be classified based on a subset of the data value ranges mention above, additional data value ranges, or different types of criteria.

After the data packet is classified, the network component is able to determine how to handle or process the data. For instance, based on the classification of the data packet, the network component may associate the data packet with a certain queue of data packets and store the data packet at the end of the queue. Then, the data packets in the queue are processed in the order in which they were stored in the queue. For example, data packets that are stored in a particular queue may be output via a particular transmission path so that they quickly reach their intended destination computer, may be evaluated to determine if the data packets are authorized to be received and further processed by the network component, may be prevented from being forwarded on the network, may be processed in a particular manner, etc. Accordingly, the network component classifies incoming data packets according to various rules based on the specific data values contained in the data packet headers HDR and processes the data packets based on their classification.

Since the network component must classify each and every data packet that it receives, it should ideally classify the data packets at a speed that equals at least the speed at which the data packets are received, otherwise knows as "wire speed". By classifying the data packets as quickly as they are received, data packets do not become "bottlenecked" at the input of the network component, and the overall operational speed of the network is not degraded.

However, as the speeds at which networks are capable of transmitting data packets increase, the speeds at which network components must be able to classify and process data packets must likewise increase. For example, on a high speed Sonet network that is capable of transmitting ten gigabits per second, data packets can be transmitted at a rate of 30 million packets per second, and on a full duplex line, data packets can be transmitted at about 60 million packets per second. Thus, network components must be able to classify data packets at extraordinary speeds.

In addition to classifying data packets at high speeds, network components must be able to classify the data packets based on several parameter fields within the packet. Currently, classifying the data packets based on the several parameter fields results in classifying the packets based on hundreds of rules. Thus, to properly classify the incoming data packets without creating a bottleneck at the input of the network component, the component must determine which rule of the hundreds of rules corresponds to each of the incoming data packets and must make such determination at a very high speed. Furthermore, as the number of network users and the number of different services available on the network increase, the number of rules that will need to be evaluated by standard network components is expected to grow to ten thousand or more in the near future. As a result, the network components will need to classify data packets according to an extremely large number of rules at incredible speeds.

In light of the above demands, network components must be designed that can efficiently classify and process the data packets that are transmitted at very high speeds. In the example described above in which classified data packets are classified and stored in particular queues based on their classification, the processing speed of the network component is somewhat enhanced. However, the network component is only able to perform basic operations on the data packets travelling on the network and cannot associate groups of data packets together so that they can be processed more efficiently. Furthermore, the network component is unable to associate data packets travelling downstream in the network with corresponding data packets travelling upstream in the network. As a result, the downstream data packets and upstream data packets are processed separately in accordance with separate processes, and the overall efficiency of the network components in the network is decreased.

Also, in the above example, the loads of the processors that process the data packets within the network component are not monitored or evaluated. As a result, the various process flows of the data packets cannot be allocated among the processors such that the processing loads of the processors are evenly balanced. By not allocating the process flows of the data packets to the various processors such that the loads of the processors are balanced, the overall efficiency of the network component is degraded, and the data and/or applications received by the network component cannot be processed in real time or at wire speed. Thus, a substantial need exists for a system in which process flows of data packets are allocated to packet processors in such a manner that the loads of the processors are evenly balanced.

Network systems have been developed that generally balance the processing loads of various processors in certain applications. However, such systems do not suggest balancing the processing load of processors within a network component by designating particular processors to handle certain process flows of data packets.

For example, U.S. Pat. No. 6,026,425 to Suguri et al. ("the '425 patent") discloses a system that estimates the processing loads of several nodes and determines whether or not a particular node is capable of accepting a task based on its processing load. Such patent is incorporated herein by reference for all purposes and a brief description of the disclosed system is provided below.

As shown in FIG. 5 of the '425 patent, the system contains a plurality of nodes NODE1 to NODEn for processing various tasks. Also, each of the nodes NODE1 to NODEn contains a load balancing apparatus 10 and is connected to a logical ring network 60B. New tasks to be processed by one of the nodes NODE1 to NODEn are input to the logical ring network 60B and initially supplied to the first node NODE1. Upon receiving a new task, the load balancing apparatus 10 within the node NODE1 determines whether or not the processing load of the node NODE1 is greater than a threshold value. If the processing load is less than the threshold value, the new task is processed by the node NODE1.

On the other hand, if the processing load is greater than the threshold value, the task is not processed by the first node NODE1 and is output to the logical ring network 60B. In such case, the new task is then supplied to the second node NODE1, and the load balancing apparatus 10 within the node NODE2 determines whether or not the processing load of the node NODE2 is greater than a threshold value. If the processing load is less than the threshold value, the new task is processed by the node NODE2. On the other hand, if the processing load is greater than the threshold value, the task is again output to the logical ring network 60B and supplied to the third node NODE3.

The above process is repeated until the new task is supplied to a node that is able to process the task. If none of the nodes NODE1 to NODEn is able to process the task, the task is again supplied to first node NODE1 via the logical ring network 60B and continues to travel around the logical ring network 60B until one of the nodes NODE1 to NODEn is able to accept and process the task.

As noted above, the system in the '425 patent balances the processing loads of entire nodes with each other. Furthermore, in order to balance the load of the nodes NODE1 to NODEn, a load balancing apparatus 10 must be included in each and every one of the nodes NODE1 to NODEn to independently monitor the processing load of the nodes NODE1 to NODEn. Since the determination of which node will handle a packet is done individually and sequentially, delays may occur, especially when scaling the solution. As a result, the load balancing apparatus 10 is impractical for use in a system that must operate in real-time or at wire speed. Also, the system in the '425 patent does not balance the processing loads of the nodes NODE1 to NODEn based on the "process flows" of the tasks input to the logical ring network.

U.S. Pat. No. 6,006,259 to Adelman et al. ("the '259 patent") generally provides for balancing of loads among end-nodes within a network. For that prurpose, a computer system is required in each of the end-nodes. These systems, otherwise known as a "web switch", allow an end-user to have the perception that one end-node is working for him or her, while in reality a plurality of such end-nodes are performing certain applications. This solution does not address the issue of balancing the loads of processors based on the process flows of the data packets transmitted over the network in a network element, working independently of other network elements. The '259 patent therefore cannot ensure operation at wire speed, especially when scaling is required, as the distribution of the end-nodes may be significant. Thus, the '259 patent cannot be employed in a system to monitor the operation of a node of a network and efficiently manage the operation of a node to ensure that it operates in an extremely efficient manner. Moreover, the '259 patent does address how the load is divided between the end-nodes. The disclosure of the U.S. Pat. No. 5,983,281 to Ogle et al. ("the '281 patent") deals with balancing the loads between gateways handling the transmission of packets between end-nodes. As described in the patent, a first end-node sends a packet to a second end-node through a plurality of gateways, and a determination of which gateways should be used is done such the load on the gateway system is reduced. While somewhat different in nature from the '259 patent described above, both the '259 and '281 patents relate to the global distribution of loads between independent systems. Therefore, when wire speed operation is required (e.g., when dautomatic decision making is required), the distributed solutions disclosed in the '259 and '281 patents do not provide an acceptable answer to the issue of load balancing. The '259 patent and the '281 patent are incorporated herein by reference for all purposes.

Also, U.S. Pat. No. 5,841,775 to Huang ("the '775 patent") is incorporated herein by reference for all purposes and discloses a network system in which data packets can be routed from a certain input terminal to a certain output terminal via one of several possible routing paths. Furthermore, the data packets are sequentially transferred from the certain input terminal to the certain output terminal by alternatively routing the data packets over the several possible routing paths. As a result, the loads of the processors contained within the various routing paths are relatively balanced. Also, if a particular path of the several possible routing paths contains a malfunction or is overloaded, data packets are not supplied to the output terminal via the particular path and are routed to the output terminal via one of the remaining routing paths.

However, the '775 patent does not teach a system that balances the load among various processors by designating certain processors to process data packets belonging to a particular flow. Thus, the disclosed system is not well suited for processing data packets in real time or at wire speed.

U.S. Pat. No. 5,825,860 to Moharran ("the '860 patent") and U.S. Pat. No. 5,271,003 to Lee et al. ("the '003 patent") generally relate to systems in which data is selectively supplied to various processors and are incorporated herein by reference for all purposes. However, the systems disclosed in the '860 patent and the '003 patent are not well suited for overcoming the problems described above.

SUMMARY OF THE INVENTION

One object of the present invention is to provide an apparatus and a method that can overcome the disadvantages and problems described above.

Another object of the present invention is to provide an apparatus and a method that can overcome disadvantages and problems besides the disadvantages and problems described above.

Yet another object of the present invention is to provide an apparatus and a method that balances the load among a plurality of packet processors based upon various factors influencing the load on the processors.

A further object of the present invention is to provide an apparatus and a method that balances the load among a plurality of packet processors by designating certain processors to process data packets corresponding to certain process flows.

In order to achieve the above and other objects, a method of distributing processing loads is provided. The method comprises: (a) receiving a first data packet; (b) determining whether or not any packet processors have been previously selected to process said first data packet based on a classification of said first data packet; (c) when none of said packet processors has been previously designated to process said first data packet, selecting a first selected processor of said packet processors to process said first data packet, wherein said first selected processor is selected based on processing load values respectively corresponding to processing loads of said packet processors.

In order to additionally achieve the above and other objects, a software program contained on a computer readable medium is provided. The software program enables a controller to perform a routine, comprising: (a) receiving a first data packet; (b) determining whether or not any packet processors have been previously selected to process said first data packet based on a classification of said first data packet; (c) when none of said packet processors has been previously designated to process said first data packet, selecting a first selected processor of said packet processors to process said first data packet, wherein said first selected processor is selected based on processing load values respectively corresponding to processing loads of said packet processors.

In order to even further achieve the above and other objects, an apparatus for distributing processing loads is provided. The apparatus comprises: a controller; and a plurality of packet processors coupled to said controller, wherein said controller receives a first data packet and determines whether or not any of said packet processors have been previously selected to process said first data packet based on a classification of said first data packet, wherein, when none of said packet processors has been previously designated to process said first data packet, said controller selects a first selected processor of said packet processors to process said first data packet, wherein said first selected processor is selected based on processing load values respectively corresponding to processing loads of said packet processors.

In order to still further achieve the above and other objects, a method for distributing processing loads of a plurality of packet processors is provided. The method comprises: (a) receiving input data packets from a stream of data packets; (b) determining which of said input data packets are unclassified data packets, wherein said unclassified data packets have unclassified data packet classifications and none of said packet processors has been previously designated to process data packets having any of said unclassified data packet classifications; and (c) selecting designated processors of said packet processors to process said unclassified data packets based on load information, wherein said packet processors respectively have processing loads and said load information corresponds to said processing loads.

In order to additionally achieve the above and other objects, a software program contained in a computer readable medium for balancing a load among a plurality of packet processors is provided. The software program enables a controller to perform a routine, comprising: (a) receiving input data packets from a stream of data packets; (b) determining which of said input data packets are unclassified data packets, wherein said unclassified data packets have unclassified data packet classifications and none of said packet processors has been previously designated to process data packets having any of said unclassified data packet classifications; and (c) selecting designated processors of said packet processors to process said unclassified data packets based on load information, wherein said packet processors respectively have processing loads and said load information corresponds to said processing loads.

In order to even further achieve the above and other objects, an apparatus is provided. The apparatus comprises: a plurality of packet processors; and a controller, wherein said controller receives input data packets from a stream of data packets and determines which of said input data packets are unclassified data packets, wherein said unclassified data packets have unclassified data packet classifications and none of said packet processors has been previously designated to process data packets having any of said unclassified data packet classifications, wherein said controller selects designated processors to process said unclassified data packets based on load information, and wherein said packet processors respectively have processing loads and said load information corresponds to said processing loads.

BRIEF DESCRIPTION OF THE DRAWINGS

The above and other objects and advantages of the present invention will become more apparent by describing in detail preferred embodiments thereof with reference to the attached drawings in which:

FIG. 3 illustrates an example of classifying processing loads of the packet processors shown in FIG. 2;

FIG. 4 illustrates an example of assigning new process flows to the packet processors shown in FIG. 2;

FIG. 5 illustrates a second example of classifying processing loads of the packet processors shown in FIG. 2;

FIG. 6 illustrates a third example of classifying processing loads of the packet processors shown in FIG. 2;

FIG. 7 illustrates a fourth example of classifying processing loads of the packet processors shown in FIG. 2;

DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

The subject matter disclosed in the present application is generally related to the subject matter disclosed in an application that is entitled "Apparatus and Method for Wire-Speed Classification and Pre-Processing of Data Packets in a Full Duplex Network". The application was filed on Apr. 3, 2000, invented by Michael Ben-Nun, Sagi Ravid, and Offer Weil, and assigned to the assignee of the present application. Such application is incorporated herein by reference for all purposes.

Figure 1:
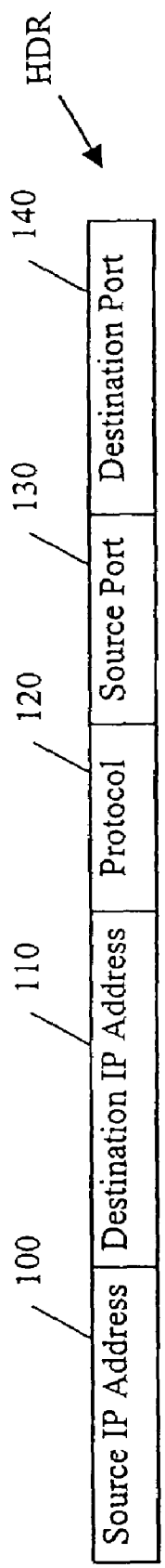
FIG. 1 illustrates an example of the format of a header of a data packet.
Figure 2:
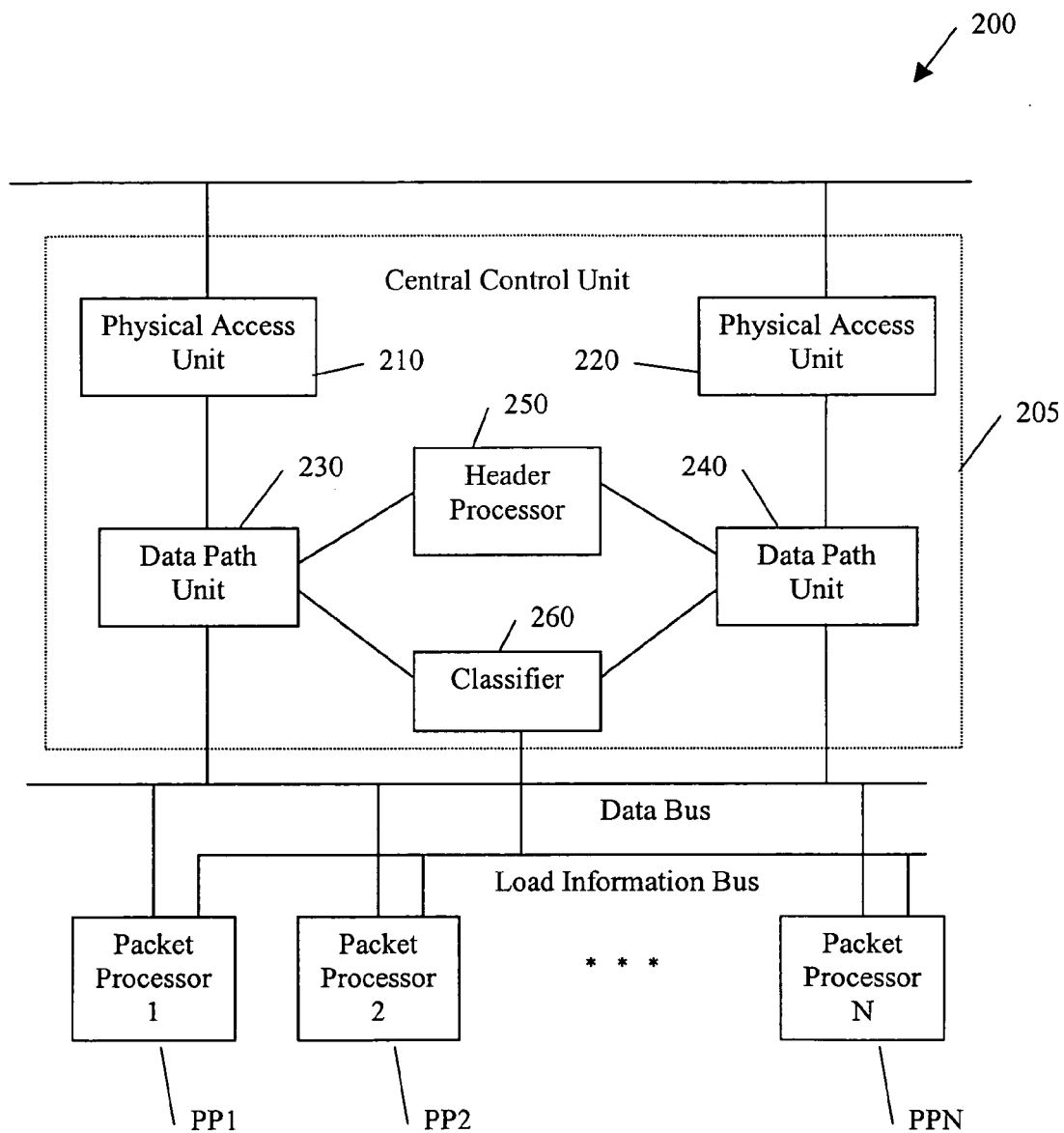
FIG. 2 illustrates an example of the structure of a network monitoring and classifying system according to an embodiment of the present invention.

The present invention relates to a monitoring and classifying system that can simultaneously monitor the upstream and downstream flow of data packets. An illustrative, non-limiting embodiment of the system 200 is shown in FIG. 2 and comprises a central control unit ("CCU 205") and a plurality of packet processors PP1 to PPN. Also, the CCU 205 comprises physical access units 210 and 220, data path units 230 and 240, a header processor 250, and a classifying unit 260. In a preferred embodiment, the system 200 at least partially constitutes a network component, and the network component can be located at a node of a network or between nodes of the network. In an alternative embodiment, the network component can be directly coupled to more than two nodes of the network.

The physical access unit 210 comprises standard layer one and layer two components that input and capture data packets travelling upstream from one node to another node of the network. The physical access unit 210 can be created from one or more commercially available hardware units known as physical access ("PHY") devices, and media access control ("MAC") devices. Also, the physical access unit 220 is similar to the unit 210, except that it inputs and captures data travelling downstream from one node to another node.

In one example, the physical access unit 210 may input and capture data packets travelling from a first node to a second node of the network, and the physical access unit 220 may input and capture data packets travelling from the second node to the first node. Furthermore, the units 210 and 220 are not limited to inputting and capturing data packets that are transmitted between the same nodes of the network. For instance, the physical access unit 210 may input data packets that are transmitted from the first node to the second node, and the physical access unit 220 may input data packets that are transmitted from the second node to a third node. Alternatively, the physical access unit 210 may input data packets that are transmitted from the first node to the second node, and the physical access unit 220 may input data packets that are transmitted from the third node to the first node. In another embodiment, the unit 210 may input data packets that are transmitted from the first node to the second node, and the unit 220 may input data packets that are transmitted from the third node to a fourth node.

The data path unit 230 inputs and stores the data packets captured by the physical access unit 210 and performs preliminary validity and error checking operations on the data packets to ensure that they are valid and error-free. For example, the data path unit 230 may perform IP and transport control protocol ("TCP") standard checksum operations and internet protocol version 4 ("IPV4") operations to verify the validity of an incoming packet. The data path may further determine if the lengths of the data packets fall within an acceptable range of lengths. If the data packets are valid and error-free, the data path unit 230 extracts the data packet headers HDR from the data packets and forwards them to the header processor 250 and the classifier 260.

The data path unit 230 can be created from hardware, software, or a combination of hardware and software. Also, since the structure and operation of the data path unit 240 is similar to the structure and operation of the data path unit 230, a detailed description of the unit 240 is omitted for the sake of brevity.

The header processor 250 inputs the data packet headers HDR from the data path units 230 and 240 and classifies the data packets by determining which rule or rules of a predetermined set of rules correspond to each of the headers HDR. An illustrative example of a device that classifies data packets according to a predetermined set of rules is described in a U.S. patent application entitled "High Speed Apparatus and Method for Classifying a Data Packet Based on Data Values Contained In The Data Packet". The application was filed on Feb. 29, 2000, invented by Michael Ben-Nun, and assigned to the assignee of the present application. Such application is incorporated herein by reference for all purposes. In a preferred embodiment, if the header HDR of a data packet does not correspond to any of the predetermined rules, the header processor 250 generates a "flow-kill" command. Such command is output to the classifier 260 via the data path unit 230 or 240 to inform the classifier 260 that the corresponding data packet does not correspond to any of the predetermined rules and that there is no need to maintain a process flow for such packets.

The classifier 260 inputs the headers HDR of the data packets and evaluates the headers HDR to determine a specific "flow" corresponding to each of the data packets. A specific flow relates to the communications or the transfer of data packets between two computers (or nodes) of the network. For instance, data packets transmitted from a first source computer (or node) to a first destination computer (or node) of the network belong to a first flow, and data packets transmitted from the first source computer (or node) to a second destination computer (or node) belong to a second flow. By evaluating the contents of the HDR of a data packet, the classifier 260 can determine the specific flow corresponding to the data packet.

In addition, in a full duplex communications system, downstream data packets may be transferred from a first computer (or node) to a second computer (or node), and upstream data packets may be transferred from the second computer (or node) to the first computer (or node). In such a scenario, the classifier 260 may consider both the downstream and upstream data packets to correspond to the same flow. For example, assume that the first computer has an IP address "A" and the second computer has an IP address "B". If a first data packet is transmitted downstream from the first computer to the second computer, the first header HDR of the first data packet has a source IP address that equals "A" and has a destination IP address that equals "B". As described above, the first header HDR is extracted from the data packet via the data path unit 240 and supplied to the classifier 260, and upon evaluating the first header HDR, the classifier 260 classifies the packet as belonging to the first flow. On the other hand, if a second data packet is transmitted upstream from the second computer to the first computer, for example for the purpose of acknowledging receipt of such first packet by the second computer, the second header HDR of the second data packet would have a source IP address that equals "B" and would have a destination IP address that equals "A". In such case, the data path unit 230 extracts the second header HDR from the data packet and outputs it to the classifier 260 as described above. Then, the classifier 260 evaluates the second header HDR and also classifies the second packet as belonging to the first flow. In other words, the classifier 260 classifies both the first and second data packets as belonging to the first flow because they are part of the same full duplex communication between the first and second computers.

In the above example, the classifier 260 determines the flow to which a data packet belongs based on the source and destination IP addresses contained in the header HDR of the data packet. In addition to determining the flow of a data packet based on the IP addresses, the classifier 260 may also determine the flow based on the source and destination port values contained in the header HDR of the data packet. For example, in a full duplex communication system, if a first downstream data packet has a source IP address "A", a source port value "A1", a destination IP address "B", and a destination port value "B1", the classifier 260 may classify the first downstream data packet as belonging to a first flow. Similarly, a first upstream data packet having a source IP address "B", a source port value "B1", a destination IP address "A", and a destination port value "A1" may still be classified as belonging to the first flow. However, a second downstream data packet having a source IP address "A", a source port value "A2", a destination IP address "B", and a destination port value "B2" may be classified as belonging to a second flow. Furthermore, the classifier 260 can additionally or alternatively identify a specific flow of the data packet based on the protocol value contained in the header HDR of the data packet.

Each of the packet processors PP1 to PPN is designated to process data packets belonging to a particular flow. For example, a first packet processor (e.g. the processor PP1) may be designated to process data packets belonging to a first flow, and a second packet processor (e.g. the processor PP2) may be designed to process data packets belonging to a second flow. Since the packet processor PP1 is the only processor that processes data packets belonging to the first flow, it performs the same or similar types of processing functions for such data packets. As a result, the processor PP1 is able to predict the types of data packets that it will receive and predict the types of processing operations it will have to perform. Thus, the processor PP1 is capable of utilizing parallel processing, data cache hits, and other types of processing techniques to increase its processing speed and efficiently and quickly process the data packets corresponding to the first flow. Similarly, since the packet processor PP2 is the only processor that processes data packets belonging to the second flow, it is able to process all of the data packets belong to the second flow in an extremely quick and efficient manner.

Also, as described above, upstream and downstream data packets that belong to the same flow are processed by a single packet processor PP1, PP2, . . . or PPN. As a result, two different packet processors are not required to separately process the upstream data packets and the downstream data packets. Thus, fewer processors PP1 to PPN are required to process the data packets transmitted on the network, and the overall processing operation of the network is enhanced. In addition, as shown in FIG. 2, the packet processors PP1 to PPN are connected to the data path units 230 and 240 via a data bus. As a result of such architecture, packet processors can easily be added to or removed from the system. Thus, as the number of process flows handled by the system 200 increases (or decreases), processors can be simply added to (or removed from) the system 200 to accommodate the change in the number of process flows.

Figure 8:
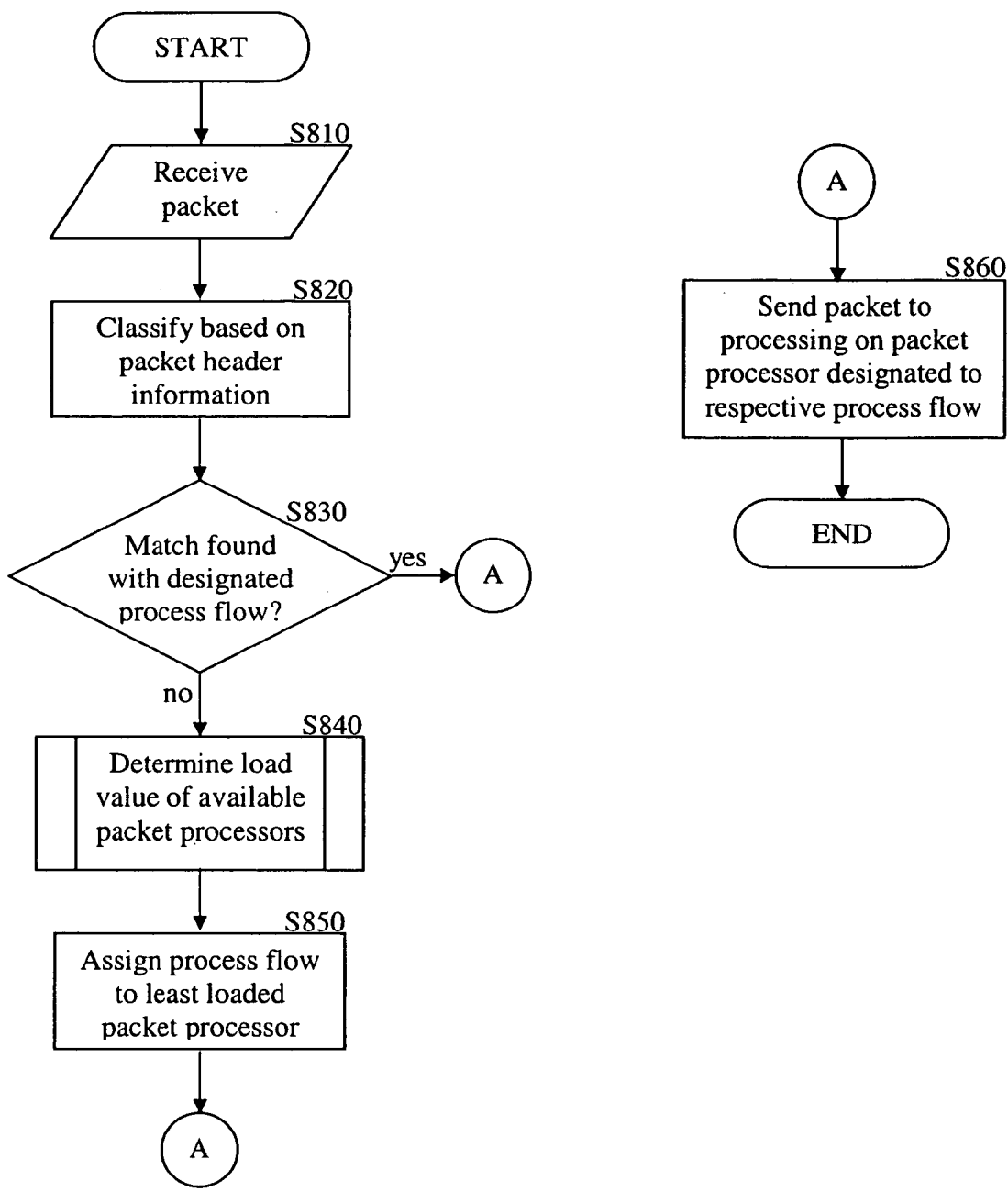
FIG. 8 illustrates a flowchart of classifying processing loads of packet processors according to an illustrative, non-limiting embodiment of the invention.

The classifier 260 designates which packet processors PP1 to PPN process data packets corresponding to the various flows and instructs the data path units 230 and 240 to output the data packets to the appropriate processor PP1, PP2, . . . , or PPN. In one embodiment, the classifier 260 designates which processors PP1 to PPN will process the data packets, in the following manner. First, as described above, the classifier 260 receives a particular header HDR of a particular data packet (see FIG. 8, S810) and determines that the particular data packet corresponds to a particular flow (see FIG. 8, S820). Then, the classifier 260 determines if any of the packet processors PP1 to PPN have previously been designated to process data packets belonging to the particular flow. If the classifier 260 determines that one of the packet processors PP1 to PPN has been previously designated to process the particular flow (see FIG. 8, S830, branch "yes"), the classifier 260 determines that the particular data packet should be output to the particular data processor (see FIG. 8, S860).

On the other hand, if none of the processors PP1 to PPN have been previously designated to process the particular flow (see FIG. 8, S830, branch "no"), the particular flow is considered to be a new flow. In such case, the classifier 260 selects one of the processors PP1 to PPN to process data packets belonging to the new flow based on the processing load of the processors PP1 to PPN (see FIG. 8, step S840) and determines that the particular data packet (see FIG. 8, step S850), and any subsequent data packet belonging to the same process flow, should be output to the selected data processor.

Figure 9:
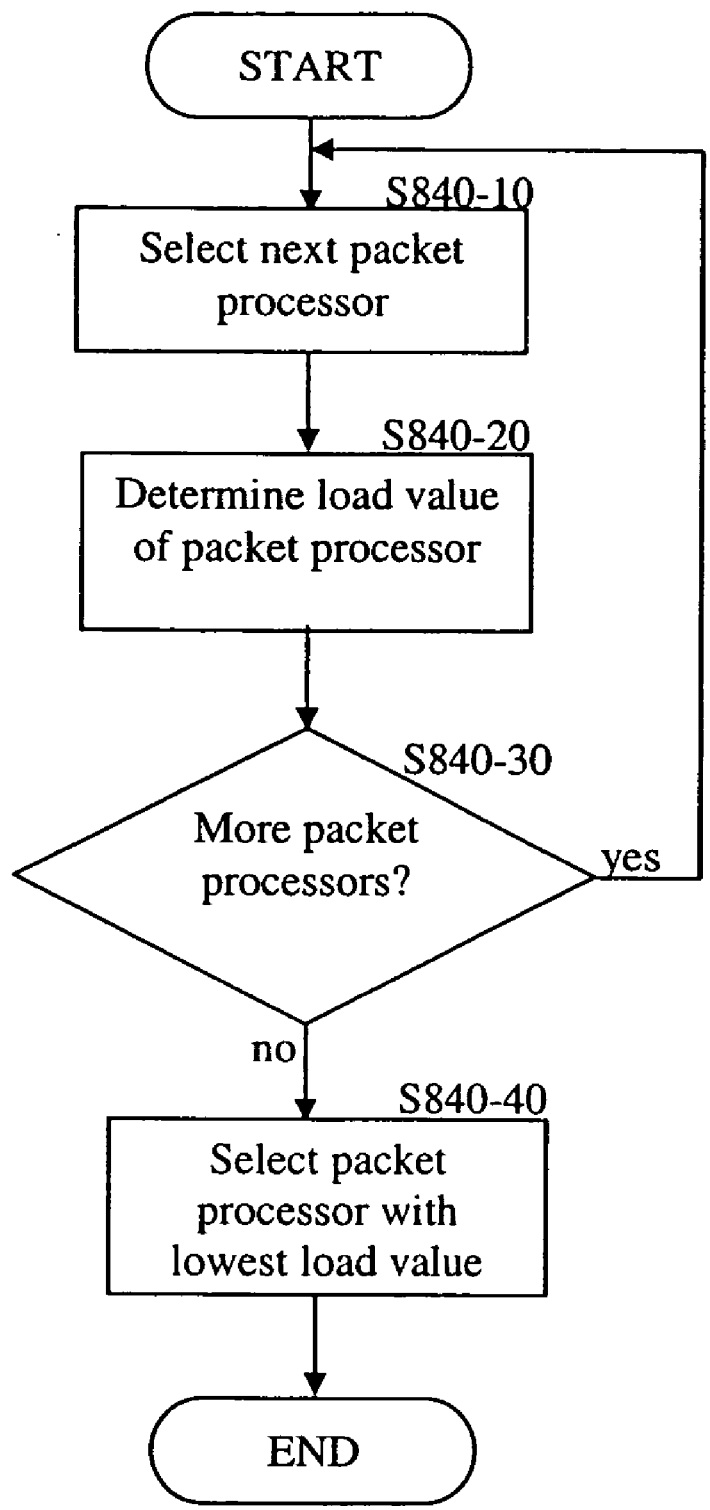
FIG. 9 illustrates a flowchart of determining the packet processor least loaded from the packet processors according to an illustrative, non-limiting embodiment of the invention.

In one embodiment, the classifier 260 receives, in real time, processing load information from the packet processors PP1 to PPN via the Load Information Bus illustrated in FIG. 2 (see FIG. 9, S840-10 through S840-30), and such information indicates the processing loads (see FIG. 9, step S840-20) of the processors PP1 to PPN. Upon receiving the processing load information, the classifier 260 determines the processing load of the processors PP1 to PPN based on such information (see FIG. 8, S840, and FIG. 9, step S840-40). Then, the classifier 260 assigns the new flow to the packet processors PP1 to PPN based on their processing load (see FIG. 8, S850).

For example, FIG. 3 illustrates processing load information that is output from each of the packet processors PP1 to PPN based on its processing load. In particular, if a particular packet processor (e.g. PP1) has an extremely heavy processing load and cannot effectively process any additional data, it is deemed to be "unavailable". Thus, it outputs a "00" to the classifier 260 as the processing load information. Upon receiving such information, the classifier 260 determines that it cannot designate the processor PP1 to handle any new process flows. If the processor PP1 has a very heavy processing load, it is deemed to be "heavily loaded". In such case, the processor PP1 outputs a "01" to the classifier 260 as the processing load information. Based on such information, the classifier 260 determines that it can only assign a few more new process flows to the processor PP1. If the processor PP1 has an average processing load, it is deemed to be "moderately loaded". In such instance, the processor PP1 outputs a "10" to the classifier 260 as the processing load information. Upon receiving such information, the classifier 260 determines that it can occasionally assign new process flows to the processor PP1. Finally, if the processor PP1 has a relatively light processing load, it is deemed to be "lightly loaded". As a result, the processor PP1 outputs a "11" to the classifier 260 as the processing load information. When the classifier 260 receives such information, it determines that the processor PP1 is available to handle as many new process flows as necessary.

As shown in FIG. 3, the processing load information is divided into four categories. However, the number of categories is clearly not limited to four, and the processing load information may be divided into more or less categories based on the specific application of the invention.

After receiving the processing load information from the processors PP1 to PPN, the classifier 260 is able to assign the new process flow to the processors PP1 to PPN such that the processing loads of the processors PP1 to PPN are evenly balanced. As a result, the overall efficiency of the system 200 is enhanced because potential bottlenecks of data packets at overloaded processors are eliminated and because the resources of the system 200 are fully utilized in the most efficient manner possible. Moreover, the classifier 260 is always updated, in real-time, of the current load information of each of the packet processors.

In one implementation, the classifier 260 evaluates the processing load information and determines which processor PP1 . . . , or PPN has the smallest processing load. Then, the classifier 260 assigns the new process flow to the packet processor PP . . . , or PPN having the smallest load. If more than one of the processors PP1 to PPN are categorized as having the smallest processing load, the classifier 260 sequentially assigns new process flows all of the processors falling within such category. For instance, if the processors PP2, PP5, and PP6 are all categorized as having the smallest processing load (e.g. the processors PP2, PP5, and PP6 output processing load information that equals "11"), the classifier 260 may initially assign a new process flow to the processor PP2. Then, the classifier 260 may assign the next new process flow to the processor PP5. Afterwards, when another new process flow needs to be assigned, the classifier 260 may assign the process flow to the processor PP6. The classifier 260 may continue to repeatedly and sequentially assign new process flows to the processors PP2, PP5, and PP6 until the load of one of the processors (e.g. the processor PP5) increases such that the processor PP5 is no longer classified as having the smallest processing load (e.g. the processing load information output from the processor PP5 equals "10"). In such case, the classifier 260 continues to repeatedly and sequentially assign new process flows to only the processors PP2 and PP6.

In the example described above, the classifier 260 identifies all of the packet processors that are categorized as having the smallest processing load (e.g. processors PP2, PP5, and PP6) and sequentially assigns new flows to the processors PP2, PP5, and PP6 in a particular order. However, the present invention is clearly not limited to assigning flows to the processors PP2, PP5, and PP6 in any particular order, and the classifier 260 may randomly assign new flows to the processors PP2, PP5, and PP6. Furthermore, the classifier 260 may not assign new flows to the processors PP1 to PPN based only on the processing load information and may evaluate other information to determine which one of the processors PP1 to PPN to designate to handle the flow. For instance, a subset of the processors PP1 to PPN may be specifically adapted to process a particular type of flow. In such case, if a new flow is received and is the particular type of flow, the classifier 260 may evaluate the processing load information received from the subset of the processors PP1 to PPN and determine which processor within the subset of the processors PP1 to PPN should process the new flow.

In another implementation, the classifier 260 does not assign new flows to only the packet processors PP1 to PPN that are categorized as having the smallest load. Specifically, the classifier 260 analyses the processing load information of the packet processors PP1 to PPN and assigns new flows to the packet processors PP1 to PPN with a frequency that is based on the load information of the processors PP1 to PPN. An illustrative example of how the classifier 260 assigns new flows in such manner is described below in conjunction with FIG. 4.

As shown in FIG. 4, eight packet processors PP1 to PP8 are contained in the system 200. During the first round of assigning new process flows to the packet processors PP1 to PP8, the classifier 260 only assigns new flows to the processors that have the smallest processing load. In the present example, the classifier 260 assigns new flows to the processors having processing load information that equals "11". Thus, the classifier 260 sequentially assigns the first and second process flows to the processors PP1 and PP6, respectively.

During the second round of assigning new process flows to the packet processors PP1 to PP8, the classifier 260 only assigns new flows to the processors that have the smallest processing load and that have the second smallest processing load. In the present example, the classifier 260 assigns new flows to the processors having processing load information that equals "11" and "10". Thus, the classifier 260 sequentially assigns the third to sixth new process flows to the processors PP1, PP2, PP6, and PP7, respectively.

During the third round of assigning new process flows to the packet processors PP1 to PP8, the classifier 260 only assigns new flows to the processors that have the smallest processing load and that have the third smallest processing load. In the present example, the classifier 260 assigns new flows to the processors having processing load information that equals "11" and "01". Thus, the classifier 260 sequentially assigns the seventh to eleventh new process flows to the processors PP1, PP3, PP4, PP6, and PP8, respectively.

During the fourth round of assigning new process flows to the packet processors PP1 to PP8, the classifier 260 only assigns new flows to the processors that have the smallest processing load and that have the second smallest processing load. In the present example, the classifier 260 assigns new flows to the processors having processing load information that equals "11" and "10". Thus, the classifier 260 sequentially assigns the twelfth to fifteenth new process flows to the processors PP1, PP2, PP6, and PP7, respectively.

As shown in the above example, the classifier 260 assigns new process flows to the packet processors having the smallest processing load (i.e. the processors PP1 and PP6) every round. Also, the classifier 260 assigns new process flows to the packet processors having the second smallest processing load (i.e. the processors PP2 and PP7) every second round. In addition, the classifier 260 assigns new process flows to the packet processors having the third smallest processing load (i.e. the processors PP3, PP4, and PP8) every third round. Finally, the classifier does not assign new process flows to the "unavailable" processors (i.e. processor PP5) during any round. As a result, the frequency with which the classifier 260 assigns new process flows to the processors PP1 to PP8 is based on the processing loads of the processors PP1 to PP8.

Although in the above embodiment, the classifier 260 assigns new process flows to the packet processors PP1 to PP8 in the manner described above and illustrated in FIG. 4, the embodiment is not limited to such method of assignment. For example, the classifier 260 may assign new flows to the processors PP1 to PP8 in any manner such that new process flows are assigned to the processors PP1 to PP8 at a frequency that corresponds to their processing loads.

In another embodiment, the processing load information output from the packet processors PP1 to PPN does not contain the data shown in FIG. 3. Instead, each of the processors PP1 to PPN may output processing load information that indicates the number of processing flows it is currently handling. Then, the classifier 260 may determine the relative loads of the processors PP1 to PPN based on the load information and the total number of flows that have been assigned to all of the processors PP1 to PPN.

For example, the classifier 260 may keep track of the total number of process flows that have been assigned to all of the processors PP1 to PPN and may calculate percentage of the process flows being handled by each of the processors PP1 to PPN based on the processing load information received from the processors PP1 to PPN. For instance, assume that four processors PP1 to PP4 are contained in the system 200 and that a total of 100 process flows have been assigned to the processors PP1 to PP4. Also, assume that the processing load information indicates that the first processor PP1 is handling 50 process flows, the second processor PP2 is handling 25 process flows, the third processor PP3 is handling 15 process flows, and the fourth processor PP4 is handling 10 process flows. In such a scenario, the classifier 260 can easily determine that the relative processing loads of the processors PP1 to PP4 are 50%, 25%, 15%, and 10%, respectively.

In the above example, the classifier 260 may determine which processor PP1, PP2, PP3, or PP4 has the smallest processing load by directly evaluating the relative processing load percentages. On the other hand, the classifier 260 may categorize the processing loads of the processors PP1 to PP4 into categories based on the percentages. For instance, in the above example, the classifier 260 may categorize the processing loads of the processors PP1 to PP4 based on the table shown in FIG. 5. According to the example above, the processor PP1 (with a relative processing load percentage of 50%) would be considered to be "heavily loaded", the processor PP2 (with a relative processing load percentage of 25%) would be considered to be "moderately loaded", and the processors PP3 and PP4 (with relative processing load percentages of 15% and 10%) would be considered to be "lightly loaded". Then, the classifier 260 may assign new flows to the processors PP1 to PP4 in a manner that is similar to any one of the manners described above in conjunction with FIGS. 3 and 4.

Also, as described above, the number of categories shown in FIG. 5 for classifying the loads of the processors equals four. However, the number of categories clearly can be greater than or less than four depending on the particular application of the invention.

In another embodiment, the packet processors PP1 to PPN output processing load information that corresponds to the time that the processors PP1 to PPN are in an idle mode (i.e. not performing any substantive tasks). An example of when the processors PP1 to PPN are in an idle mode is when they are performing certain memory clean-up activities. When the classifier 260 receives the processing load information from the processors PP1 to PPN, it is able to evaluate the information to determine the processing load of the processors PP1 to PPN. Specifically, if the processing load information indicates that a particular packet processor is in an idle mode very frequently and/or for long periods of time, the classifier 260 considers the processing load on the processor to be relatively small. In other words, the processing load of the particular packet processor is inversely related to the amount of time that the particular packet processor is in the idle mode.

In the present embodiment, the classifier 260 may determine which processor PP1, PP2, PP3, or PP4 has the smallest processing load by directly evaluating the amount of time that the processors PP1 to PP4 are in the idle mode. On the other hand, the classifier 260 may categorize the processing loads of the processors PP1 to PP4 into the categories shown in FIG. 6 based on the amount of time that the processors are in the idle mode. For instance, in the above example, the classifier 260 (1) may consider a processor to be "unavailable" if it has been in the idle mode for less than an amount of time A, (2) may consider the processor to be "heavily loaded" if it has been in the idle mode for greater than the amount of time A and less than an amount of time B, (3) may consider the processor to be "moderately loaded" if it has been in the idle mode for greater than the amount of time B and less than an amount of time C, and (4) may consider the processor to be "lightly loaded" if it has been in the idle mode for greater than the amount of time C. The amounts of time A, B, and C shown in FIG. 6 may correspond to actual times, a cumulation of times over a certain time period, or percentages of times over a certain time period. Also, the amounts of time A, B, and C may correspond to other measurements of time. After the processing loads of the processors PP1 to PP4 are classified into the categories shown in FIG. 6, the classifier 260 may assign a new flow to the processor in a manner that is similar to any one of the manners described above in conjunction with FIGS. 3 and 4.

As described above, the number of categories shown in FIG. 6 for classifying the loads of the processors equals four. However, the number of categories clearly can be greater than or less than four depending on the particular application of the invention.

In an additional embodiment, the classifier 260 determines the processing load of the packet processors PP1 to PPN by determining the amount of data that is routed to the processors PP1 to PPN. For example, the classifier 260 may determine the processing load of a particular packet processor (e.g. processor PP1) by determining the number of bits per second that is supplied to the processor PP1. The number of bits per second supplied to the processor PP1 may be based on the number of bits supplied to the processor PP1 over a predetermined period of time or may be a running average of the number of bits being continuously supplied to the processor PP1. If the rate at which data is supplied to the processor PP1 is relatively large, the classifier 260 determines that the processing load of the processor PP1 is relatively high. On the other hand, if the rate at which data is supplied to the processor PP1 is relatively small, the processing load of the processor PP1 is relatively low. In other words, the rate at which data is supplied to the processor PP1 is directly related to the processing load of the processor PP1.

In the embodiment described above, the classifier 260 may determine the processing loads of the processors PP1 to PPN by directly evaluating the rate at which data is supplied to the processors PP1 to PPN. Alternatively, the classifier 260 may categorize the processing loads of the processors PP1 to PPN into the categories shown in FIG. 7 based on the rate at which data is supplied. For example, in the above example, the classifier 260 (1) may consider a processor to be "unavailable" if the rate at which data is supplied to the processor exceeds a data rate A, (2) may consider the processor to be "heavily loaded" if the rate at which data is supplied to the processor is less than the data rate A and greater than a data rate B, (3) may consider the processor to be "moderately loaded" if the rate at which data is supplied to the processor is less than the data rate B and greater than a data rate C, and (4) may consider the processor to be "lightly loaded" if the rate at which data is supplied to the processor is less than the data rate C. Then, the classifier 260 may assign a new flow to the processor in a manner that is similar to any one of the manners described above in conjunction with FIGS. 3 and 4.

Also, as mentioned above, the number of categories shown in FIG. 7 for classifying the loads of the processors equals four. However, the number of categories clearly can be greater than or less than four depending on the particular specific application of the invention.

In the embodiments described above in conjunction with FIGS. 3, 6, and 7, a unique situation arises when the processing load of all of the packet processors PP1 to PPN in the system 200 is extremely heavy and all of the processors PP1 to PPN are categorized as "unavailable". In such a situation, if the classifier 260 continued to operate according to the examples described above, the classifier 260 would not be able to assign any new flows to any of the processors PP1 to PPN. On the other hand, in a preferred embodiment, the classifier avoids such a problem in the following manner.

First, when the classifier 260 determines that all of the packet processors PP1 to PPN in the system are overloaded and "unavailable", the classifier 260 resets the status of all of the processors PP1 to PPN (or instructs the packet processors PP1 to PPN to reset their own status) to the "lightly loaded" status. Then, the classifier 260 assigns new process flows to the packet processors PP1 to PPN in accordance with any of the embodiments described above.

In an alternative implementation of the embodiment, the classifier 260 does not reset the status of all of the packet processors PP1 to PPN (or does not instruct all of the packet processors PP1 to PPN to reset their own status) to the "lightly loaded" status. Instead, the classifier 260 readjusts the threshold levels of load balancing system by scaling the threshold levels of the load balancing system. For example, assume that the load balancing system contains four packet processors PP1 to PP4, and the processing loads of the processors PP1 to PP4 are determined in accordance with the processing load percentages contained in the load balancing table shown in FIG. 5. If the loads of the processors PP1 to PP4 equal 75%, 85%, 90% and 95%, respectively, all of the processors PP1 to PP4 are deemed to be "unavailable". In such a scenario, the classifier 260 resets the status of at least one of the processors PP1 to PP4 (or instructs at least one of the processors PP1 to PP4 to reset its own status) so that at least one of the processors PP1 to PP4 does not have the "unavailable" status. For instance, the classifier 260 may reclassify the processing loads of the processors PP1 to PP4 such that a processing load percentage of 0% to 79% corresponds to the "lightly loaded" status, a processing load percentage of 80% to 89% corresponds to the "moderately loaded" status, a processing load percentage of 90% to 95% corresponds to the "heavily loaded" status, and a processing load percentage of 96% to 100% corresponds to the "unavailable" status. Based on the reclassified processing loads, the processor PP1 is deemed to be "lightly loaded", the processor PP2 is deemed to be "moderately loaded", and the processors PP3 and PP4 are deemed to be "heavily loaded". Afterwards, the classifier 260 assigns new flows to the processor PP1 to PP4 based on the readjusted processing loads. Also, if the processing load percentages of all of the processors PP1 to PP4 fall below 80% so that all of the processors PP1 to PP4 are deemed to be "lightly loaded", the classifier 260 may again reclassify the processing loads of the processors PP1 to PP4 in accordance with the values contained in the table shown in FIG. 5.

Clearly, the present embodiment is not limited to the specific example described above. For example, those skilled in the art would easily be able to apply the above embodiment to other types of load balancing systems. In addition, the classifier 260 could reclassify the processing loads of the processors PP1 to PP4 in accordance with different ranges of processing load percentages.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. For example, in most of the embodiments described above, new process flows are allocated to the various packet processors PP1 to PPN such that the processing loads of the processors PP1 to PPN are approximately equal. However, such embodiments can be modified such that the new process flows are assigned to the processors PP1 to PPN in a manner that the processing loads of the processors PP1 to PPN have a certain ratio with respect to each other. Alternatively, the new process flows can be assigned such that the processing loads of the processors PP1 to PPN do not exceed particular thresholds respectively assigned to the processors PP1 to PPN, and such thresholds may or may not have different values. Therefore, the present invention is not intended to be limited to the embodiments described herein but is to be accorded the widest scope as defined by the claims and equivalents thereof.

In addition, various operations recited in the claims are designated alphabetically. However, such designations are not intended to indicate the order in which the operations are to be performed. For example, the alphabetically designated operations can be performed in different orders than the alphabetized order and can even be performed simultaneously in some instances.

What is claimed is:

1. A method of distributing processing loads, comprising:
   (a) receiving a first data packet;
   (b) determining whether or not any packet processors have been previously selected to process said first data packet based on a classification of said first data packet; and
   (c) when none of said packet processors has been previously designated to process said first data packet, selecting a first selected processor of said packet processors to process said first data packet, wherein said first selected processor is selected based on processing load values respectively corresponding to processing loads of said packet processors,
   wherein step (c) comprises:
   (c1) when none of said packet processors has been previously designated to process said first data packet, using a controller to select said first selected processor of said packet processors to process said first data packet, wherein said controller selects said first selected processor based on said processing load values respectively corresponding to said processing loads of said packet processors, and
   wherein said processing load values are respectively generated in said packet processors and respectively output to said controller.

2. The method as claimed in claim 1, wherein said classification classifies said first data packet as corresponding to a process flow regardless of whether said first data packet is an upstream data packet or a downstream data packet.

3. A software program contained on a computer readable medium, wherein the software program enables a controller to perform a routine, comprising:
(a) receiving a first data packet;
(b) determining whether or not any packet processors have been previously selected to process said first data packet based on a classification of said first data packet; and
(c) when none of said packet processors has been previously designated to process said first data packet, selecting a first selected processor of said packet processors to process said first data packet, wherein said first selected processor is selected based on processing load values respectively corresponding to processing loads of said packet processors,
wherein said step (c) comprises:
(c1) when none of said packet processors have been previously designated to process said first data packet, selecting said first selected processor to process said first data packet based on which of said packet processors has a processing load value corresponding to a lowest processing load category of said processing load categories, and
wherein said processing load values are respectively generated in said packet processors and respectively output to said controller.

4. The software program as claimed in claim 3, wherein said classification classifies said first data packet as corresponding to a process flow regardless of whether said first data packet is an upstream data packet or a downstream data packet.

5. An apparatus for distributing processing loads, comprising:
a controller; and
a plurality of packet processors coupled to said controller,
wherein said controller receives a first data packet and determines whether or not any of said packet processors have been previously selected to process said first data packet based on a classification of said first data packet,
wherein, when none of said packet processors has been previously designated to process said first data packet, said controller selects a first selected processor of said packet processors to process said first data packet,
wherein said first selected processor is selected based on processing load values respectively corresponding to processing loads of said packet processors, and
wherein said processing load values are respectively generated in said packet processors and respectively output to said controller.

6. The apparatus as claimed in claim 5, wherein said classification classifies said first data packet as corresponding to a process flow regardless of whether said first data packet is an upstream data packet or a downstream data packet.

7. A method for distributing processing loads of a plurality of packet processors, comprising:
(a) receiving input data packets from a stream of data packets;
(b) determining which of said input data packets are unclassified data packets, wherein said unclassified data packets have unclassified data packet classifications and none of said packet processors has been previously designated to process data packets having any of said unclassified data packet classifications; and
(c) selecting designated processors of said packet processors to process said unclassified data packets based on load information, wherein said packet processors respectively have processing loads and said load information corresponds to said processing loads,
wherein said load information comprises processing load values that respectively correspond to said processing loads of said packet processors,
wherein said packet processors respectively output said processing load values to a controller, and
wherein said controller selects said designated processors based on said processing load values.

8. The method as claimed in claim 7, wherein said unclassified data packets have said unclassified data packet classifications according to a classification which classifies said input data packets as respectively corresponding to process flows regardless of whether said input data packets are upstream data packets or are downstream data packets.

9. A software program contained in a computer readable medium for balancing a load among a plurality of packet processors, wherein the software program enables a controller to perform a routine, comprising:
(a) receiving input data packets from a stream of data packets;
(b) determining which of said input data packets are unclassified data packets, wherein said unclassified data packets have unclassified data packet classifications and none of said packet processors has been previously designated to process data packets having any of said unclassified data packet classifications; and
(c) selecting designated processors of said packet processors to process said unclassified data packets based on load information, wherein said packet processors respectively have processing loads and said load information corresponds to said processing loads,
wherein said load information comprises processing load values that respectively correspond to said processing loads of said packet processors,
wherein said packet processors respectively output said processing load values to a said controller, and
wherein said controller selects said designated processors based on said processing load values.

10. The software program as claimed in claim 9, wherein said unclassified data packets have said unclassified data packet classifications according to a classification which classifies said input data packets as respectively corresponding to process flows regardless of whether said input data packets are upstream data packets or are downstream data packets.

11. An apparatus, comprising:
a plurality of packet processors; and
a controller, wherein said controller receives input data packets from a stream of data packets and determines which of said input data packets are unclassified data packets,
wherein said unclassified data packets have unclassified data packet classifications and none of said packet processors has been previously designated to process data packets having any of said unclassified data packet classifications,
wherein said controller selects designated processors to process said unclassified data packets based on load information,
wherein said packet processors respectively have processing loads and said load information corresponds to said processing loads, and
wherein said load information comprises processing load values that respectively correspond to said processing loads of said packet processors, wherein said packet processors respectively output said processing load values to said controller, and wherein said controller selects said designated processors based on said processing load values.

12. The apparatus as claimed in claim 11, wherein said unclassified data packets have said unclassified data packet classifications according to a classification which classifies said input data packets as respectively corresponding to process flows regardless of whether said input data packets are upstream data packets or are downstream data packets.

13. A method of distributing processing loads, comprising:
(a) receiving a first data packet;
(b) determining whether or not any packet processors have been previously selected to process said first data packet based on a classification of said first data packet, wherein said classification classifies said first data packet as corresponding to a process flow regardless of whether said first data packet is an upstream data packet or a downstream data packet; and
(c) when none of said packet processors has been previously designated to process said first data packet, selecting a first selected processor of said packet processors to process said first data packet, wherein said first selected processor is selected based on processing load values respectively corresponding to processing loads of said packet processors.

14. The method as claimed in claim 13, wherein said step (c) comprises:
(c1) selecting said first selected processor to process all data packets corresponding to said process flow of said first data packet.

15. The method as claimed in claim 13, wherein said step (c) comprises:
(c1) determining which packet processor of said packet processors has a lowest processing load based on said processing load values; and
(c2) selecting said packet processor having said lowest processing load as said first selected processor.

16. The method as claimed in claim 13, wherein each of said processing load values represents one of a plurality of processing load categories,
wherein said processing load categories range from a smallest processing load category to a largest processing load category.

17. The method as claimed in claim 16, wherein said step (c) comprises:
(c1) when none of said packet processors have been previously designated to process said first data packet, selecting said first selected processor to process said first data packet based on which of said packet processors has a processing load value corresponding to a lowest processing load category of said processing load categories.

18. The method as claimed in claim 13, wherein step (c) comprises:
(c1) when none of said packet processors has been previously designated to process said first data packet, using a controller to select said first selected processor of said packet processors to process said first data packet, wherein said controller selects said first selected processor based on said processing load values respectively corresponding to said processing loads of said packet processors.

19. The method as claimed in claim 18, wherein said controller determines said processing load values of said packet processors based on a percentage of a total number of tasks that said controller has assigned to each of said packet processors.

20. The method as claimed in claim 19, wherein said tasks correspond to process flows of data packets that said controller has designated said packet processors to process.

21. The method as claimed in claim 18, wherein said processing load values correspond to an idle time of each of said packet processors.

22. The method as claimed in claim 18, wherein said processing load values correspond to a rate at which data is supplied to each of said packet processors.

23. A software program contained on a computer readable medium, wherein the software program enables a controller to perform a routine, comprising:
(a) receiving a first data packet;
(b) determining whether or not any packet processors have been previously selected to process said first data packet based on a classification of said first data packet, wherein said classification classifies said first data packet as corresponding to a process flow regardless of whether said first data packet is an upstream data packet or a downstream data packet; and
(c) when none of said packet processors has been previously designated to process said first data packet, selecting a first selected processor of said packet processors to process said first data packet, wherein said first selected processor is selected based on processing load values respectively corresponding to processing loads of said packet processors.

24. The software program as claimed in claim 23, wherein said step (c) comprises:
(c1) selecting said first selected processor to process all data packets corresponding to said process flow of said first data packet.

25. The software program as claimed in claim 23, wherein said step (c) comprises:
(c1) determining which packet processor of said packet processors has a lowest processing load based on said processing load values; and
(c2) selecting said packet processor having said lowest processing load as said first selected processor.

26. The software program as claimed in claim 23, wherein each of said processing load values represents one of a plurality of processing load categories,
wherein said processing load categories range from a smallest processing load category to a largest processing load category.

27. The software program as claimed in claim 26, wherein said step (c) comprises:
(c1) when none of said packet processors have been previously designated to process said first data packet, selecting said first selected processor to process said first data packet based on which of said packet processors has a processing load value corresponding to a lowest processing load category of said processing load categories.

28. The software program as claimed in claim 23, wherein said controller determines said processing load values of said packet processors based on a percentage of a total number of tasks that said controller has assigned to each of said packet processors.

29. The software program as claimed in claim 28, wherein said tasks correspond to process flows of data packets that said controller has designated said packet processors to process.

30. The software program as claimed in claim 23, wherein said processing load values correspond to an idle time of each of said packet processors.

31. The software program as claimed in claim 23, wherein said processing load values correspond to a rate at which data is supplied to each of said packet processors.

32. An apparatus for distributing processing loads, comprising:
   a controller; and
   a plurality of packet processors coupled to said controller,
   wherein said controller receives a first data packet and determines whether or not any of said packet processors have been previously selected to process said first data packet based on a classification of said first data packet,
   wherein said classification classifies said first data packet as corresponding to a process flow regardless of whether said first data packet is an upstream data packet or a downstream data packet,
   wherein, when none of said packet processors has been previously designated to process said first data packet, said controller selects a first selected processor of said packet processors to process said first data packet, and
   wherein said first selected processor is selected based on processing load values respectively corresponding to processing loads of said packet processors.

33. The apparatus as claimed in claim 32, wherein said controller selects said first selected processor to process all data packets corresponding to said process flow of said first data packet.

34. The apparatus as claimed in claim 32, wherein said controller determines which packet processor of said packet processors has a lowest processing load based on said processing load values, and
   wherein said controller selects said packet processor having said lowest processing load as said first selected processor.

35. The apparatus as claimed in claim 32, wherein each of said processing load values represents one of a plurality of processing load categories,
   wherein said processing load categories range from a smallest processing load category to a largest processing load category.

36. The apparatus as claimed in claim 35, wherein, when none of said packet processors have been previously designated to process said first data packet, said controller selects said first selected processor to process said first data packet based on which of said packet processors has a processing load value corresponding to a lowest processing load category of said processing load categories.

37. The apparatus as claimed in claim 32, wherein said controller determines said processing load values of said packet processors based on a percentage of a total number of tasks that said controller has assigned to each of said packet processors.

38. The apparatus as claimed in claim 37, wherein said tasks correspond to process flows of data packets that said controller has designated said packet processors to process.

39. The apparatus as claimed in claim 32, wherein said processing load values correspond to an idle time of each of said packet processors.

40. The apparatus as claimed in claim 32, wherein said processing load values correspond to a rate at which data is supplied to each of said packet processors.

41. A method for distributing processing loads of a plurality of packet processors, comprising:
   (a) receiving input data packets from a stream of data packets;
   (b) determining which of said input data packets are unclassified data packets, wherein said unclassified data packets have unclassified data packet classifications and none of said packet processors has been previously designated to process data packets having any of said unclassified data packet classifications; and
   (c) selecting designated processors of said packet processors to process said unclassified data packets based on load information, wherein said packet processors respectively have processing loads and said load information corresponds to said processing loads,
   wherein said load information comprises processing load values that respectively correspond to said processing loads of said packet processors,
   wherein each of said processing load values categorizes a corresponding processing load of a corresponding packet processor and ranges from a first load value, indicating a lowest processing load category, to an nth load value, indicating a highest processing load category,
   wherein "n" is an integer greater than one,
   wherein said step (c) comprises:
      (c1) evaluating said processing load values and selecting said designated processors to process said unclassified data packets at frequencies that respectively correspond to said processing loads,
   wherein said step (c1) comprises:
      (c1a) grouping any of said packet processors that are associated with processing load values corresponding to a first processing load category of said processing load values into a first processor group and grouping any of said packet processors that are associated with processing load values that correspond to a second processing load category of said processing load values into a second processor group,
      wherein said second processing load category represents a higher processing load category than said first processing load category; and
      (c1b) selecting said packet processors in said first processor group to be some of said designated processors at a first frequency and selecting said packet processors in said second processor group to be some of said designated processors at a second frequency, wherein said first frequency is greater than a second frequency,
   wherein said first processing load category corresponds to a smallest processing load category of said packet processors and said second processing load category corresponds to a second smallest processing load category of said packet processors, and
   wherein said step (c1b) comprises:
      (c1b1) selecting at least some of said packet processors in said first processor group to be some of said designated processors during every round of selecting said designated processors; and
      (c1b2) selecting at least some of said packet processors in said second processor group to be some of said designated processors during every two rounds of selecting said designated processors.

42. The method as claimed in claim 41,
wherein said step (c1a) comprises:
(c1a1) grouping any of said packet processors that are associated with processing load values corresponding to a third smallest processing load category into a third processor group and grouping any of said packet processors that are associated with processing load values corresponding to a fourth smallest processing load category into a fourth processor group, and
wherein said step (c1b) further comprises:
(c1b3) selecting at least some of said packet processors in said third processor group to be some of said designated processors during every three rounds of selecting designated processors; and
(c1b2) selecting at least some of said packet processors in said fourth processor group to be some of said designated processors during every four rounds of selecting designated processors.

43. The method as claimed in claim 41,
wherein said step (c1a) comprises:
(c1a1) grouping any of said packet processors that are associated with said processing load values corresponding to said highest processing load category into an unavailable group, and
wherein said step (c1b) further comprises:
(c1b3) refraining from selecting any of said packet processors in said unavailable group as said designated processors.

44. The method as claimed in claim 43, further comprising:
(d) when all of said packet processors are grouped in said unavailable group, resetting said processing load values respectively associated with said packet processors so that said processing load values correspond to a processing load category that is less than said highest processing load category.

45. The method as claimed in claim 43, further comprising:
(d) when all of said packet processors are grouped in said unavailable group, resetting said processing load values respectively associated with said packet processors so that said processing load values correspond to said lowest processing load category.

46. A software program, contained in a computer readable medium for balancing a load among a plurality of packet processors, wherein the software program enables a controller to perform a routine, comprising:
(a) receiving input data packets from a stream of data packets;
(b) determining which of said input data packets are unclassified data packets, wherein said unclassified data packets have unclassified data packet classifications and none of said packet processors has been previously designated to process data packets having any of said unclassified data packet classifications; and
(c) selecting designated processors of said packet processors to process said unclassified data packets based on load information, wherein said packet processors respectively have processing loads and said load information corresponds to said processing loads,
wherein said load information comprises processing load values that respectively correspond to said processing loads of said packet processors,
wherein each of said processing load values categorizes a corresponding processing load of a corresponding packet processor and ranges from a first load value, indicating a lowest processing load category, to an nth load value, indicating a highest processing load category,
wherein "n" is an integer greater than one,
wherein said step (c) comprises:
(c1) evaluating said processing load values and selecting said designated processors to process said unclassified data packets at frequencies that respectively correspond to said processing loads,
wherein said step (c1) comprises:
(c1a) grouping any of said packet processors that are associated with processing load values corresponding to a first processing load category of said processing load values into a first processor group and grouping any of said packet processors that are associated with processing load values that correspond to a second processing load category of said processing load values into a second processor group,
wherein said second processing load category represents a higher processing load category than said first processing load category; and
(c1b) selecting said packet processors in said first processor group to be some of said designated processors at a first frequency and selecting said packet processors in said second processor group to be some of said designated processors at a second frequency, wherein said first frequency is greater than a second frequency,
wherein said first processing load category corresponds to a smallest processing load category of said packet processors and said second processing load category corresponds to a second smallest processing load category of said packet processors, and
wherein said step (c1b) comprises:
(c1b1) selecting at least some of said packet processors in said first processor group to be some of said designated processors during every round of selecting said designated processors; and
(c1b2) selecting at least some of said packet processors in said second processor group to be some of said designated processors during every two rounds of selecting said designated processors.

47. The software program as claimed in claim 46,
wherein said step (c1a) comprises:
(c1a1) grouping any of said packet processors that are associated with processing load values corresponding to a third smallest processing load category into a third processor group and grouping any of said packet processors that are associated with processing load values corresponding to a fourth smallest processing load category into a fourth processor group, and
wherein said step (c1b) further comprises:
(c1b3) selecting at least some of said packet processors in said third processor group to be some of said designated processors during every three rounds of selecting designated processors; and
(c1b2) selecting at least some of said packet processors in said fourth processor group to be some of said designated processors during every four rounds of selecting designated processors.

48. The software program as claimed in claim 46,
wherein said step (c1a) comprises:
(c1a1) grouping any of said packet processors that are associated with said processing load values corresponding to said highest processing load category into an unavailable group, and wherein said step (c1b) further comprises:

(c1b3) refraining from selecting any of said packet processors in said unavailable group as said designated processors.

49. The software program as claimed in claim 48, further comprising:

(d) when all of said packet processors are grouped in said unavailable group, resetting said processing load values respectively associated with said packet processors so that said processing load values correspond to a processing load category that is less than said highest processing load category.

50. The software program as claimed in claim 48, further comprising:

(d) when all of said packet processors are grouped in said unavailable group, resetting said processing load values respectively associated with said packet processors so that said processing load values correspond to said lowest processing load category.

51. An apparatus, comprising:

a plurality of packet processors; and a controller, wherein said controller receives input data packets from a stream of data packets and determines which of said input data packets are unclassified data packets, wherein said unclassified data packets have unclassified data packet classifications and none of said packet processors has been previously designated to process data packets having any of said unclassified data packet classifications, wherein said controller selects designated processors to process said unclassified data packets based on load information, wherein said packet processors respectively have processing loads and said load information corresponds to said processing loads, wherein said load information comprises processing load values that respectively correspond to said processing loads of said packet processors, wherein each of said processing load values categorizes a corresponding processing load of a corresponding packet processor and ranges from a first load value, indicating a lowest processing load category, to an nth load value, indicating a highest processing load category, wherein "n" is an integer greater than one, wherein said controller evaluates said processing load values and selects said designated processors to process said unclassified data packets at frequencies that respectively correspond to said processing loads, wherein said controller groups any of said packet processors that are associated with processing load values corresponding to a first processing load category of said processing load values into a first processor group and groups any of said packet processors that are associated with processing load values that correspond to a second processing load category of said processing load values into a second processor group, wherein said second processing load category represents a higher processing load category than said first processing load category, wherein said controller selects said packet processors in said first processor group to be some of said designated processors at a first frequency and selects said packet processors in said second processor group to be some of said designated processors at a second frequency, and wherein said first frequency is greater than a second frequency, wherein said first processing load category corresponds to a smallest processing load category of said packet processors and said second processing load category corresponds to a second smallest processing load category of said packet processors, and wherein said controller selects at least some of said packet processors in said first processor group to be some of said designated processors during every round of selecting said designated processors and selects at least some of said packet processors in said second processor group to be some of said designated processors during every two rounds of selecting said designated processors.

52. The apparatus as claimed in claim 51, wherein said controller groups any of said packet processors that are associated with processing load values corresponding to a third smallest processing load category into a third processor group and groups any of said packet processors that are associated with processing load values corresponding to a fourth smallest processing load category into a fourth processor group, wherein said controller selects at least some of said packet processors in said third processor group to be some of said designated processors during every three rounds of selecting designated processors, wherein said controller selects at least some of said packet processors in said fourth processor group to be some of said designated processors during every four rounds of selecting designated processors.

53. The apparatus as claimed in claim 51, wherein said controller groups any of said packet processors that are associated with said processing load values corresponding to said highest processing load category into an unavailable group, and wherein said controller refrains from selecting any of said packet processors in said unavailable group as said designated processors.

54. The apparatus as claimed in claim 53, wherein, when all of said packet processors are grouped in said unavailable group, said controller resets said processing load values respectively associated with said packet processors so that said processing load values correspond to a processing load category that is less than said highest processing load category.

55. The apparatus as claimed in claim 53, wherein, when all of said packet processors are grouped in said unavailable group, said controller resets said processing load values respectively associated with said packet processors so that said processing load values correspond to said lowest processing load category.

56. A method for distributing processing loads of a plurality of packet processors, comprising:

(a) receiving input data packets from a stream of data packets;

(b) determining which of said input data packets are unclassified data packets, wherein said unclassified data packets have unclassified data packet classifications and none of said packet processors has been previously designated to process data packets having any of said unclassified data packet classifications, wherein said unclassified data packets have said unclassified data packet classifications according to a classification which classifies said input data packets as respectively corresponding to process flows regardless of whether said input data packets are upstream data packets or are downstream data packets; and (c) selecting designated processors of said packet processors to process said unclassified data packets based on load information, wherein said packet processors respectively have processing loads and said load information corresponds to said processing loads.

57. The method as claimed in claim 56, wherein step (b) comprises:
(b1) determining which of said input data packets are classified data packets, wherein said classified data packets have classified data packet classifications and one of said packet processors has been previously designated to process data packets having said classified data packet classifications,
wherein said classified data packets have said classified data packet classifications according to said classification.

58. The method as claimed in claim 57, wherein step (c) comprises:
(c1) supplying said classified data packets to said packet processors based on which of said packet processors have been previously designated to process data packets having said classified data packet classifications.

59. The method as claimed in claim 56, wherein said unclassified data packet classifications correspond to process flows of said unclassified data packets.

60. The method as claimed in claim 58, wherein said unclassified data packet classifications correspond to process flows of said unclassified data packets and wherein said classified data packet classifications correspond to process flows of said classified data packets.

61. The method as claimed in claim 56, wherein said load information comprises processing load values that respectively correspond to said processing loads of said packet processors,
wherein each of said processing load values categorizes a corresponding processing load of a corresponding packet processor and ranges from a first load value, indicating a lowest processing load category, to an nth load value, indicating a highest processing load category, and
wherein "n" is an integer greater than one.

62. The method as claimed in claim 61, wherein said step (c) comprises:
(c1) evaluating the processing load values to determine said processing loads of said packet processors; and
(c2) selecting said packet processors categorized as having a smallest processing load of said packet processors as said designated processors to process said unclassified data packets.

63. The method as claimed in claim 61, wherein said step (c) comprises:
(c1) evaluating said processing load values and selecting said designated processors to process said unclassified data packets at frequencies that respectively correspond to said processing loads.

64. The method as claimed in claim 63, wherein said step (c1) comprises:
(c1a) grouping any of said packet processors that are associated with processing load values corresponding to a first processing load category of said processing load values into a first processor group and grouping any of said packet processors that are associated with processing load values that correspond to a second processing load category of said processing load values into a second processor group,
wherein said second processing load category represents a higher processing load category than said first processing load category; and
(c1b) selecting said packet processors in said first processor group to be some of said designated processors at a first frequency and selecting said packet processors in said second processor group to be some of said designated processors at a second frequency, wherein said first frequency is greater than a second frequency.

65. The method as claimed in claim 61, wherein said step (c) comprises:
(c1) grouping any of said packet processors that are associated with said processing load values corresponding to said highest processing load category in an unavailable processor group; and
(c2) refraining from selecting any of said packet processors in said unavailable group as said designated processors.

66. The method as claimed in claim 65, further comprising:
(d) when all of said packet processors are grouped in said unavailable group, resetting said processing load values respectively associated with said packet processors so that said processing load values correspond to a processing load category that is less than said highest processing load category.

67. The method as claimed in claim 65, further comprising:
(d) when all of said packet processors are grouped in said unavailable group, reclassifying said processing load values respectively associated with said packet processors so that at least one of said processing load values corresponds to a processing load category that is less than said highest processing load category.

68. The method as claimed in claim 65, further comprising:
(d) when all of said packet processors are grouped in said unavailable group, resetting said processing load values respectively associated with said packet processors so that said processing load values correspond to said lowest processing load category.

69. The method as claimed in claim 61, wherein said packet processors respectively output said processing load values to a controller, and
wherein said controller selects said designated processors based on said processing load values.

70. The method as claimed in claim 61, wherein a controller determines said processing load values of said packet processors based on a percentage of a total number of process flows that said controller has assigned to each of said packet processors, and
wherein said controller selects said designated processors based on said processing load values.

71. The method as claimed in claim 61, wherein said processing load values respectively correspond to amounts of process flows of data packets that have been respectively designated to be processed by said packet processors.

72. The method as claimed in claim 61, wherein said processing load values respectively correspond idle times of said packet processors.

73. The method as claimed in claim 61, wherein said processing load values respectively correspond rates at which data are supplied to said packet processors.

74. The method as claimed in claim 56, wherein said step (c) comprises:
  (c1) evaluating said load information and selecting said designated processors to process said unclassified data packets at frequencies that respectively correspond to said processing loads.

75. The method as claimed in claim 56, wherein said load information comprises processing load values that respectively correspond to said processing loads of said packet processors,
  wherein a controller determines said processing load values of said packet processors based on a percentage of a total number of process flows that said controller has assigned to each of said packet processors, and
  wherein said controller selects said designated processors based on said processing load values.

76. The method as claimed in claim 56, wherein said load information comprises processing load values that respectively correspond to said processing loads of said packet processors,
  wherein said processing load values respectively correspond to amounts of process flows of data packets that have been respectively designated to be processed by said packet processors.

77. The method as claimed in claim 56, wherein said load information comprises processing load values that respectively correspond to said processing loads of said packet processors, and
  wherein said processing load values respectively correspond idle times of said packet processors.

78. The method as claimed in claim 56, wherein said load information comprises processing load values that respectively correspond to said processing loads of said packet processors, and
  wherein said processing load values respectively correspond rates at which data are supplied to said packet processors.

79. A software program contained in a computer readable medium for balancing a load among a plurality of packet processors, wherein the software program enables a controller to perform a routine, comprising:
  (a) receiving input data packets from a stream of data packets;
  (b) determining which of said input data packets are unclassified data packets, wherein said unclassified data packets have unclassified data packet classifications and none of said packet processors has been previously designated to process data packets having any of said unclassified data packet classifications,
  wherein said unclassified data packets have said unclassified data packet classifications according to a classification which classifies said input data packets as respectively corresponding to process flows regardless of whether said input data packets are upstream data packets or are downstream data packets; and
  (c) selecting designated processors of said packet processors to process said unclassified data packets based on load information, wherein said packet processors respectively have processing loads and said load information corresponds to said processing loads.

80. The software program as claimed in claim 79, wherein step (b) comprises:
  (b1) determining which of said input data packets are classified data packets, wherein said classified data packets have classified data packet classifications and at least one of said packet processors has been previously designated to process data packets having said classified data packet classifications,
  wherein said classified data packets have said classified data packet classifications according to said classification.

81. The software program as claimed in claim 80, wherein step (c) comprises:
  (c1) supplying said classified data packets to said packet processors based on which of said packet processors have been previously designated to process data packets having said classified data packet classifications.

82. The software program as claimed in claim 81, wherein said unclassified data packet classifications correspond to process flows of said unclassified data packets and wherein said classified data packet classifications correspond to process flows of said classified data packets.

83. The software program as claimed in claim 79, wherein said unclassified data packet classifications correspond to process flows of said unclassified data packets.

84. The software program as claimed in claim 79, wherein said step (c) comprises:
  (c1) evaluating said load information and selecting said designated processors to process said unclassified data packets at frequencies that respectively correspond to said processing loads.

85. The software program as claimed in claim 79, wherein said load information comprises processing load values that respectively correspond to said processing loads of said packet processors,
  wherein a controller determines said processing load values of said packet processors based on a percentage of a total number of process flows that said controller has assigned to each of said packet processors, and
  wherein said controller selects said designated processors based on said processing load values.

86. The software program as claimed in claim 79, wherein said load information comprises processing load values that respectively correspond to said processing loads of said packet processors,
  wherein said processing load values respectively correspond to amounts of process flows of data packets that have been respectively designated to be processed by said packet processors.

87. The software program as claimed in claim 79, wherein said load information comprises processing load values that respectively correspond to said processing loads of said packet processors, and
  wherein said processing load values respectively correspond idle times of said packet processors.

88. The software program as claimed in claim 79, wherein said load information comprises processing load values that respectively correspond to said processing loads of said packet processors, and
  wherein said processing load values respectively correspond rates at which data are supplied to said packet processors.

89. The software program as claimed in claim 79, wherein said load information comprises processing load values that respectively correspond to said processing loads of said packet processors,
  wherein each of said processing load values categorizes a corresponding processing load of a corresponding packet processor and ranges from a first load value, indicating a lowest processing load category, to an nth load value, indicating a highest processing load category, and
  wherein "n" is an integer greater than one.

90. The software program as claimed in claim 89, wherein said step (c) comprises:
- (c1) evaluating the processing load values to determine said processing loads of said packet processors; and
- (c2) selecting said packet processors categorized as having a smallest processing load of said packet processors as said designated processors to process said unclassified data packets.

91. The software program as claimed in claim 89, wherein said step (c) comprises:
- (c1) evaluating said processing load values and selecting said designated processors to process said unclassified data packets at frequencies that respectively correspond to said processing loads.

92. The software program as claimed in claim 91, wherein said step (c1) comprises:
- (c1a) grouping any of said packet processors that are associated with processing load values corresponding to a first processing load category of said processing load values into a first processor group and grouping any of said packet processors that are associated with processing load values that correspond to a second processing load category of said processing load values into a second processor group,
wherein said second processing load category represents a higher processing load category than said first processing load category; and
- (c1b) selecting said packet processors in said first processor group to be some of said designated processors at a first frequency and selecting said packet processors in said second processor group to be some of said designated processors at a second frequency, wherein said first frequency is greater than a second frequency.

93. The software program as claimed in claim 89, wherein said step (c) comprises:
- (c1) grouping any of said packet processors that are associated with said processing load values corresponding to said highest processing load category in an unavailable processor group; and
- (c2) refraining from selecting any of said packet processors in said unavailable group as said designated processors.

94. The software program as claimed in claim 93, further comprising:
- (d) when all of said packet processors are grouped in said unavailable group, resetting said processing load values respectively associated with said packet processors so that said processing load values correspond to a processing load category that is less than said highest processing load category.

95. The software program as claimed in claim 93, further comprising:
- (d) when all of said packet processors are grouped in said unavailable group, reclassifying said processing load values respectively associated with said packet processors so that at least one of said processing load values corresponds to a processing load category that is less than said highest processing load category.

96. The software program as claimed in claim 93, further comprising:
- (d) when all of said packet processors are grouped in said unavailable group, resetting said processing load values respectively associated with said packet processors so that said processing load values correspond to said lowest processing load category.

97. The software program as claimed in claim 89, wherein said packet processors respectively output said processing load values to a controller, and
wherein said controller selects said designated processors based on said processing load values.

98. The software program as claimed in claim 89, wherein a controller determines said processing load values of said packet processors based on a percentage of a total number of process flows that said controller has assigned to each of said packet processors, and
wherein said controller selects said designated processors based on said processing load values.

99. The software program as claimed in claim 89, wherein said processing load values respectively correspond to amounts of process flows of data packets that have been respectively designated to be processed by said packet processors.

100. The software program as claimed in claim 89, wherein said processing load values respectively correspond idle times of said packet processors.

101. The software program as claimed in claim 89, wherein said processing load values respectively correspond rates at which data are supplied to said packet processors.

102. An apparatus, comprising:
- a plurality of packet processors; and
- a controller, wherein said controller receives input data packets from a stream of data packets and determines which of said input data packets are unclassified data packets,
wherein said unclassified data packets have unclassified data packet classifications and none of said packet processors has been previously designated to process data packets having any of said unclassified data packet classifications,
wherein said unclassified data packets have said unclassified data packet classifications according to a classification which classifies said input data packets as respectively corresponding to process flows regardless of whether said input data packets are upstream data packets or are downstream data packets,
wherein said controller selects designated processors to process said unclassified data packets based on load information, and
wherein said packet processors respectively have processing loads and said load information corresponds to said processing loads.

103. The apparatus as claimed in claim 102, wherein said controller determines which of said input data packets are classified data packets, wherein said classified data packets have classified data packet classifications and at least one of said packet processors has been previously designated to process data packets having said classified data packet classifications, and wherein said classified data packets have said classified data packet classifications according to said classification.

104. The apparatus as claimed in claim 103, wherein said controller supplies said classified data packets to said packet processors based on which of said packet processors have been previously designated to process data packets having said classified data packet classifications.

105. The apparatus as claimed in claim 102, wherein said unclassified data packet classifications correspond to process flows of said unclassified data packets.

106. The apparatus as claimed in claim 104, wherein said unclassified data packet classifications correspond to process flows of said unclassified data packets and wherein said classified data packet classifications correspond to process flows of said classified data packets.

107. The apparatus as claimed in claim 102, wherein said controller evaluates said load information and selects said designated processors to process said unclassified data packets at frequencies that respectively correspond to said processing loads.

108. The apparatus as claimed in claim 102, wherein said load information comprises processing load values that respectively correspond to said processing loads of said packet processors,
    wherein said controller determines said processing load values of said packet processors based on a percentage of a total number of process flows that said controller has assigned to each of said packet processors, and
    wherein said controller selects said designated processors based on said processing load values.

109. The apparatus as claimed in claim 102, wherein said load information comprises processing load values that respectively correspond to said processing loads of said packet processors,
    wherein said processing load values respectively correspond to amounts of process flows of data packets that have been respectively designated to be processed by said packet processors.

110. The apparatus as claimed in claim 102, wherein said load information comprises processing load values that respectively correspond to said processing loads of said packet processors, and
    wherein said processing load values respectively correspond idle times of said packet processors.

111. The apparatus as claimed in claim 102, wherein said load information comprises processing load values that respectively correspond to said processing loads of said packet processors, and
    wherein said processing load values respectively correspond rates at which data are supplied to said packet processors.

112. The apparatus as claimed in claim 102, wherein said load information comprises processing load values that respectively correspond to said processing loads of said packet processors,
    wherein each of said processing load values categorizes a corresponding processing load of a corresponding packet processor and ranges from a first load value, indicating a lowest processing load category, to an nth load value, indicating a highest processing load category, and
    wherein "n" is an integer greater than one.

113. The apparatus as claimed in claim 112, wherein said controller evaluates the processing load values to determine said processing loads of said packet processors, and selects said packet processors categorized as having a smallest processing load of said packet processors as said designated processors to process said unclassified data packets.

114. The apparatus as claimed in claim 112, wherein said controller evaluates said processing load values and selects said designated processors to process said unclassified data packets at frequencies that respectively correspond to said processing loads.

115. The apparatus as claimed in claim 114, wherein said controller groups any of said packet processors that are associated with processing load values corresponding to a first processing load category of said processing load values into a first processor group and groups any of said packet processors that are associated with processing load values that correspond to a second processing load category of said processing load values into a second processor group,
    wherein said second processing load category represents a higher processing load category than said first processing load category,
    wherein said controller selects said packet processors in said first processor group to be some of said designated processors at a first frequency and selects said packet processors in said second processor group to be some of said designated processors at a second frequency, and
    wherein said first frequency is greater than a second frequency.

116. The apparatus as claimed in claim 112, wherein said controller groups any of said packet processors that are associated with said processing load values corresponding to said highest processing load category in an unavailable processor group, and
    wherein said controller refrains from selecting any of said packet processors in said unavailable group as said designated processors.

117. The apparatus as claimed in claim 116, wherein, when all of said packet processors are grouped in said unavailable group, said controller resets said processing load values respectively associated with said packet processors so that said processing load values correspond to a processing load category that is less than said highest processing load category.

118. The apparatus as claimed in claim 116, wherein, when all of said packet processors are grouped in said unavailable group, said controller resets said processing load values respectively associated with said packet processors so that said processing load values correspond to said lowest processing load category.

119. The apparatus as claimed in claim 116, wherein, when all of said packet processors are grouped in said unavailable group, said controller reclassifies said processing load values respectively associated with said packet processors so that at least one of said processing load values corresponds to a processing load category that is less than said highest processing load category.

120. The apparatus as claimed in claim 98, wherein said packet processors respectively output said processing load values to said controller, and
    wherein said controller selects said designated processors based on said processing load values.

121. The apparatus as claimed in claim 112, wherein said controller determines said processing load values of said packet processors based on a percentage of a total number of process flows that said controller has assigned to each of said packet processors, and
    wherein said controller selects said designated processors based on said processing load values.

122. The apparatus as claimed in claim 112, wherein said processing load values respectively correspond to amounts of process flows of data packets that have been respectively designated to be processed by said packet processors.

123. The apparatus as claimed in claim 112, wherein said processing load values respectively correspond idle times of said packet processors.

124. The apparatus as claimed in claim 112, wherein said processing load values respectively correspond rates at which data are supplied to said packet processors.

* * * * *